United States Patent
Zhang

(10) Patent No.: US 10,222,538 B2
(45) Date of Patent: Mar. 5, 2019

(54) METHOD FOR MANUFACTURING LIGHT GUIDE PLATE MOLD

(71) Applicant: Wuhan China Star Optoelectronics Technology Co., Ltd., Wuhan, Hubei (CN)

(72) Inventor: Wei Zhang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 99 days.

(21) Appl. No.: 15/162,394

(22) Filed: May 23, 2016

(65) Prior Publication Data

US 2017/0261681 A1 Sep. 14, 2017

(30) Foreign Application Priority Data

Mar. 11, 2016 (CN) .......................... 2016 1 0139401

(51) Int. Cl.
 B29D 11/00 (2006.01)
 F21V 8/00 (2006.01)
 (Continued)

(52) U.S. Cl.
 CPC ........ *G02B 6/0065* (2013.01); *B29C 33/3835* (2013.01); *B29C 33/3842* (2013.01);
 (Continued)

(58) Field of Classification Search
 USPC ........................................................ 264/219
 See application file for complete search history.

(56) References Cited

U.S. PATENT DOCUMENTS 5,377,119 A * 12/1994 Backer ................ G06F 17/5018
164/4.1
5,435,818 A * 7/1995 Mashige ................. C03B 11/08
264/1.32

(Continued)

FOREIGN PATENT DOCUMENTS

CN 1188441 A 7/1998
CN 1312153 A 9/2001

(Continued)

OTHER PUBLICATIONS

Guo et al., "Prediction of warpage in plastic injection molding based on design of experiments", Journal of Mechanical Science and Technology, vol. 26, Issue 4, Apr. 2012, pp. 1133-1139.*

*Primary Examiner* — Jacob T Minskey
*Assistant Examiner* — Baileigh Kate Darnell
(74) *Attorney, Agent, or Firm* — Andrew C. Cheng

(57) ABSTRACT

A method for manufacturing a light guide plate mold includes: acquiring a deformation coefficient i, where $1 < i \leq 1.12$, and a size parameter j, where $0.03$ mm$< j \leq 0.05$ mm; applying digital simulation software to simulate a formation process of an original three-dimensional model for a light guide plate so as to acquire a simulation deformation amount of the light guide plate; multiplying the simulation deformation amount with the deformation coefficient i to obtain a counter deformation amount of a light guide plate mold; and subtracting the size parameter j from a length and a width of the light guide plate to obtain length and width dimensions of the light guide plate mold; and forming the light guide plate mold according to the counter deformation amount of the light guide plate mold and length and width dimensions of the light guide plate mold. A light guide plate manufactured with such a mold shows relatively high flatness.

9 Claims, 2 Drawing Sheets

(51) Int. Cl.
    *B29C 33/38*     (2006.01)
    *G02B 27/00*     (2006.01)
    *B29C 45/00*     (2006.01)
    *B29L 31/00*     (2006.01)

(52) U.S. Cl.
    CPC .... B29C 45/0025 (2013.01); B29D 11/00663 (2013.01); G02B 27/0012 (2013.01); *B29D 11/00971* (2013.01); *B29L 2031/757* (2013.01)

(56) References Cited

U.S. PATENT DOCUMENTS

| | | | | |
|---|---|---|---|---|
| 5,677,844 | A * | 10/1997 | Kubo | B22D 46/00 164/4.1 |
| 5,811,133 | A * | 9/1998 | Saito | B29C 45/7693 264/40.4 |
| 6,304,794 | B1 * | 10/2001 | Nishimine | B29C 33/3835 164/169 |
| 6,627,841 | B2 * | 9/2003 | Chen | B23K 31/003 219/109 |
| 7,894,931 | B2 * | 2/2011 | Arai | B29C 45/76 264/328.12 |
| 8,189,985 | B2 * | 5/2012 | Shang | G02B 6/0043 349/61 |
| 2001/0028122 | A1 * | 10/2001 | Narushima | B29C 33/3835 264/40.1 |
| 2007/0222092 | A1 * | 9/2007 | Hayashi | B29C 45/2708 264/1.1 |
| 2008/0042307 | A1 * | 2/2008 | Ueno | B29C 33/3835 264/2.5 |
| 2009/0129119 | A1 * | 5/2009 | Lee | B29C 33/3842 362/619 |
| 2013/0043607 | A1 * | 2/2013 | Yu | G02B 6/0065 264/1.27 |

FOREIGN PATENT DOCUMENTS

| | | | |
|---|---|---|---|
| CN | 101825456 | A | 9/2010 |
| CN | 101767185 | B * | 1/2012 |
| CN | 103955554 | A | 7/2014 |
| CN | 104441488 | A * | 3/2015 |
| CN | 104504195 | A | 4/2015 |

* cited by examiner

METHOD FOR MANUFACTURING LIGHT GUIDE PLATE MOLD

BACKGROUND OF THE INVENTION

1. Field of the Invention

The present invention relates to the field of display technology, and in particular to a method for manufacturing a light guide plate mold.

2. The Related Arts

A backlight module is one of the key components of a panel of a liquid crystal display. Since liquid crystal itself is not luminous, a function of the backlight module is to provide sufficient illuminations and uniformly distributed light source for the liquid crystal display for normally displaying images. In the backlight module, a light guide plate provides essential functionality thereof.

Heretofore, the manufacture of light guide plates is generally achieved through injection molding with molds. However, during molding of a light guide plate in a mold, due to various factors, such as non-uniform shrinking among various portions of the light guide plate, non-uniform temperature, and inconsistent molecule motion, the light guide plate may get warped and deformed, making the flatness of the light guide not meet requirements and thus severely affecting the product pass rate of the light guide plate. In actual manufacture, a mold may be designed based on a counter-deformation method in order to resolve the issue of warpage and deformation of the injection molded product. Therefore, designing a qualified mold is vital for a light guide plate manufacturing process.

SUMMARY OF THE INVENTION

An object of the present invention is to provide a design method for a light guide plate mold such that a light guide plate produced with a mold manufactured with such a method can be prevented from occurrence of abnormality, such as warpage and deformation.

To achieve the above object, an embodiment of the present invention provides the following technical solution:

The present invention provides a method for manufacturing a light guide plate mold, which comprises the following steps: acquiring a deformation coefficient i, where $1<i\leq1.12$, and a size parameter j, where $0.03 \text{ mm}<j\leq0.05 \text{ mm}$; applying digital simulation software to simulate a formation process of an original three-dimensional model for a light guide plate so as to acquire a simulation deformation amount of the light guide plate; multiplying the simulation deformation amount with the deformation coefficient i to obtain a counter deformation amount of a light guide plate mold; and subtracting the size parameter j from a length and a width of the light guide plate to obtain length and width dimensions of the light guide plate mold; and forming the light guide plate mold according to the counter deformation amount of the light guide plate mold and length and width dimensions of the light guide plate mold.

In the above method, the step of applying the digital simulation software to simulate a formation process of an original three-dimensional model for a light guide plate comprises using the digital simulation software to divide the original three-dimensional model of the light guide plate into grid units composed of a plurality of nodes and conducting simulation of an injection-molding process of the light guide plate so as to obtain the simulation deformation amount.

In the above method, the digital simulation software retrieves and converts node information of the grid units into a message file and a warpage deformation file, wherein the message file so formed comprises original coordinates of the grid nodes and the warpage deformation file so obtained comprises deformation-caused displacements of each of the nodes of the grid units in positive and negative axes of each of X, Y, and Z directions and an overall displacement of the node.

In the above method, the simulation deformation amount is a deformation-caused displacement of one of the nodes having maximum deformation.

In the above method, the node displacement information comprises overall displacement information or local displacement information.

In the above method, the node displacement information comprises node number for each of the nodes.

In the above method, the deformation coefficient i and the size parameter j are numerical values that are obtained through multiple times of test and experiment.

In the above method, the original three-dimensional model is simulated by using software.

In the above method, the digital simulation software is Moldflow or Moldex3D.

The embodiment of the present invention provide the following advantages or beneficial effects:

The present invention relates to a method for manufacturing a light guide plate mold, in which software is applied to simulate a formation process of a three-dimensional model of a light guide plate for the purposes of analysis. A simulation deformation amount can be obtained and is corrected to obtain a counter deformation amount of a light guide plate mold. A length dimension and a width dimension of the light guide plate model are corrected to obtain the length and width dimensions of the light guide plate mold. A light guide plate produced with the mold so manufactured with the method presents relatively high flatness, allowing for improvement of yield and efficiency of manufacturing of light guide plates.

BRIEF DESCRIPTION OF THE DRAWINGS

To more clearly explain the technical solution proposed in an embodiment of the present invention or that of the prior art, brief descriptions of the drawings that are necessary for describing the embodiment or the prior art are given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

Figure 1:
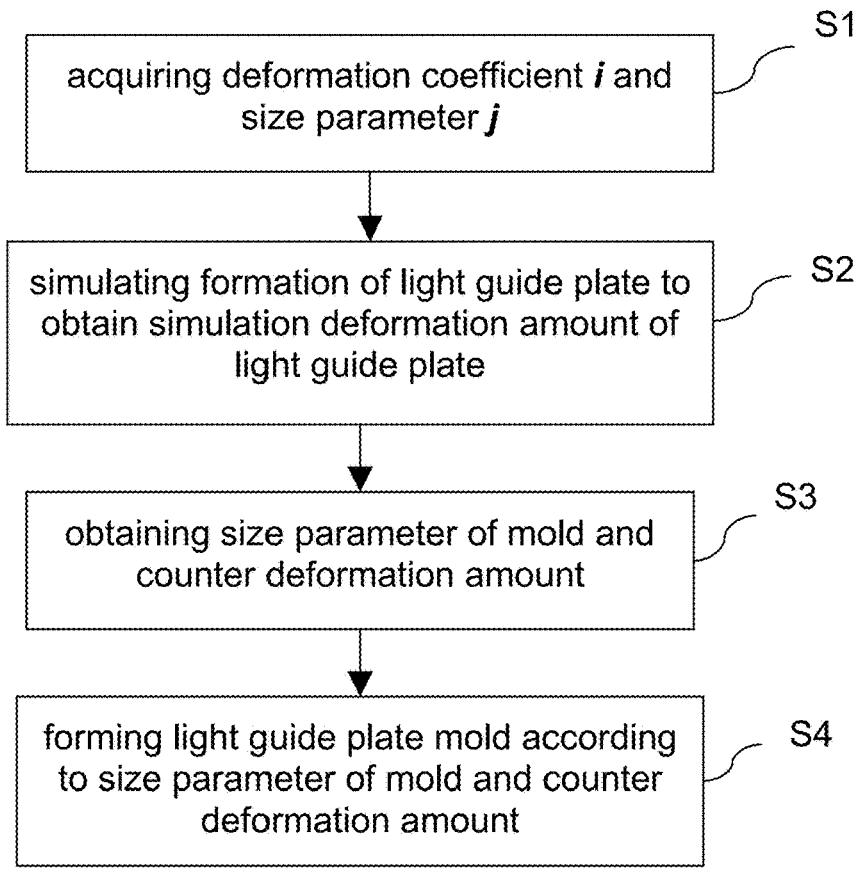
FIG. 1 is a schematic view showing a flow chart of a method for manufacturing a light guide plate mold according to the present invention.

A clear and complete description will be given to technical solutions of embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Further, the following descriptions of the various embodiments are made with reference to the attached drawings for illustrating, in an exemplary way, specific embodiments to which the present invention is applicable. Directional terminology, such as "up", "down", "front", "rear", "left", "right", "internal", "external", and "side", used in the present invention are described according to the direction shown in the drawings and are not intended to indicate or suggest a designated device or element must be of a specific direction or be constructed or operated in a specific direction and thus they should not be construed as constraint to the scope of the present invention.

In the description of the present invention, it is noted that unless explicitly specified or constrained, the terms "mounting", "interconnecting", and "connecting" should be interpreted as fixed connection and may alternatively be releasable connection or integral connection; or being mechanically connected; or in direction connection with each other or interconnected through an intermediate medium; or being communication between interiors of two elements. For those having ordinary skills in the art can appreciate the meaning of these terms as used in the present invention in specific conditions.

Further, unless specified otherwise, in the description of the present invention, "plural" means two or more than two. The term "operation", when appearing in the specification, does not just include an independent operation and may also include a desired effect of the operation achieved with the operation when the operation is not distinguishable from other operations. The symbol "-" used in the present invention to define a numeric range, of which the minimum and maximum are respectively corresponding to the figures set in front of and behind of the symbol "-". In the attached drawings, similar structures or identical units are designated with the same reference numerals.

Referring to FIG. 1, the present invention provides a method for manufacturing a light guide plate mold, which generally comprises the following steps:

Step S1: acquiring a deformation coefficient i, $1<i\leq 1.12$, and a size parameter j, 0.03 mm$<j\leq$0.05 mm.

Before a light guide plate mold is manufactured, a simulation process is often conducted first for a molding process of a light guide plate in order to acquire a simulation deformation amount. Due to certain differences existing between an actual manufacturing environment and simulation variables, a light guide plate produced with a mold manufactured by directly using the simulation deformation amount as a counter deformation amount for the light guide plate mold would hardly meet the requirement for flatness, and consequently, multiplying with a deformation coefficient i is necessary. The deformation coefficient i is generally acquired through multiple times of empirical analyses and it is determined, after multiple times of experiments, $1<i\leq 1.12$. Further, since a counter deformation amount can be pre-set for a light guide plate mold and a light guide plate produced with the light guide plate mold would be of a curved shape, length and width are subject to variation. After multiple tests and experiments, it is found that the length dimension and the width dimension of a light guide plate produced with the light guide plate mold that is manufactured with correction made with the counter deformation amount so obtained are greater than target sizes by a specific amount j. This amount j is referred to as a size parameter, 0.03 mm$<j\leq$0.05 mm. Consequently, in the manufacture of the light guide plate mold, a length dimension and a width dimension of the light guide plate mold should be respectively subtracted with the size parameter j.

Step S2: applying digital simulation software to simulate a formation process of an original three-dimensional model for the light guide plate so as to acquire a simulation deformation amount of the light guide plate.

Specifically, digital simulation software is used to simulate or establish an original three-dimensional model of the light guide plate by input of data including machining parameters and environment variables to the digital simulation software. The digital simulation software is operable to divide the original three-dimensional model of the light guide plate into grid units composed of a plurality of nodes to conduct simulation of an injection-molding process of the light guide plate so at to obtain the simulation deformation amount. Specifically, the software may analyze displacement amounts of each node of the grid units in positive and negative axes of each X, Y, and Z directions resulting from deformation and consequently overall displacement of the node, thereby obtaining a file of warpage deformation. In the instant embodiment, digital simulation software is used to retrieve node information of the grid units for formation of a file of message and a file of warpage deformation. The message file so obtained contains original coordinates of the nodes of the grid and the warpage deformation file so obtained information designating deformation-caused displacement amounts of the node of the grid units in both positive and negative axes in the X, Y, and Z directions and the overall displacements of the nodes. The node displacement information may include overall displacement information or local displacement information. The node displacement information may also comprise the node number of each node.

Figure 2:
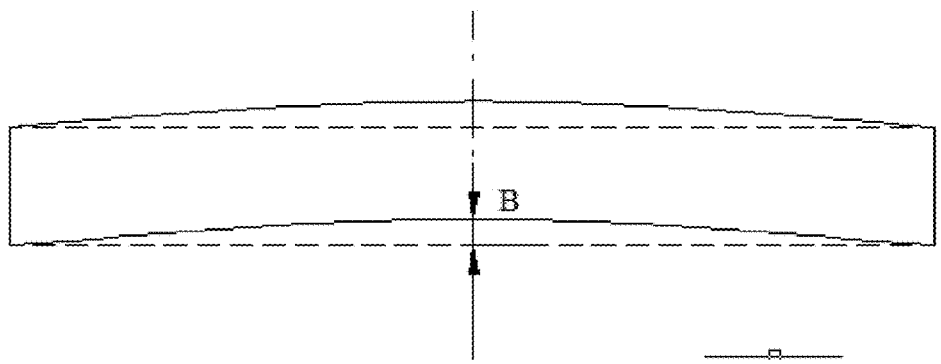
FIG. 2 is a schematic view illustrating formation of an original three-dimensional model of a light guide plate.

Specifically, referring to FIG. 2, phantom lines indicate the original three-dimensional model of the light guide plate and solid lines simulate a three-dimensional model of the injection-molded light guide plate. The simulation deformation amount is the deformation-caused displacement amount B of the node having the greatest deformation of the light guide plate.

Specifically, the digital simulation software comprises, but not limited to, Moldflow or Moldex3D, and in other embodiments, other mold flow analysis software may be used.

Step S3: multiplying the simulation deformation amount with the deformation coefficient i to obtain a counter deformation amount for the light guide plate mold; and subtracting the size parameter j from the length dimension and width dimension of the light guide plate so as to obtain the length and width of the light guide plate mold.

During cooling down of the injection-molded light guide plate, due to difference in respect of contraction and direction of stress, the light guide plate so molded may become warped and deformed and advanced deformation compensation may effectively improve such an issue of the product. The method of advanced deformation compensation is to include a pre-deformation amount in an opposite direction in the light guide plate mold so that warpage and deformation of the light guide plate during cooling down can be compensated by the pre-deformation amount, so that flatness of the light guide plate after being so deformed may meet what is needed. Since certain differences exist between an actual production environment and the simulation variables, after the simulation deformation amount of the light guide plate is determined, the simulation deformation amount needs to be corrected.

Figure 3:
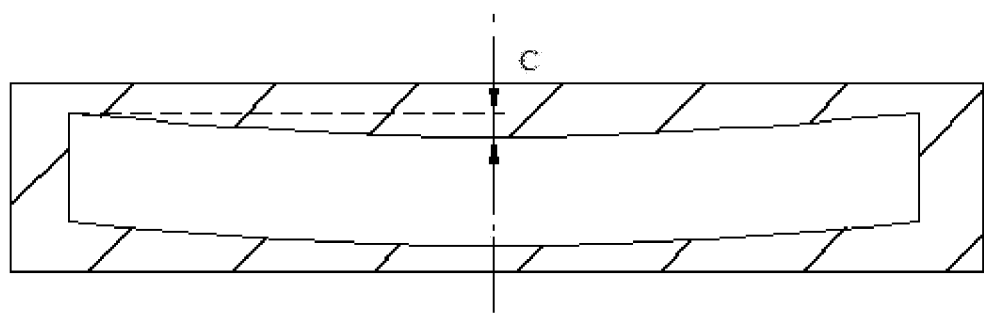
FIG. 3 is a schematic view showing a light-emitting device according to a third embodiment of the present invention.

Referring to FIGS. 2 and 3, a deformation amount C of the light guide plate mold satisfies B<C≤1.12B, and when the counter deformation amount C of the light guide plate mold and the simulation deformation amount B satisfies the condition, the light guide plate may exhibit relatively high flatness. Further, since the light guide plate mold is structured to include the counter deformation amount, it still needs to have dimensions of the length and width of the light guide plate be corrected. Multiple tests and experiments have been conducted and indicate that a size parameter j (0.03 mm<j≤0.05 mm) must be subtracted from the length dimension of the original three-dimensional model of the light guide plate in order to obtain the length dimension of the light guide plate mold. And, the size parameter j (0.03 mm<j≤0.05 mm) must also be subtracted from the width dimension of the original three-dimensional model of the light guide plate to obtain the width dimension of the light guide plate mold. There is no need to correct the thickness dimension.

Further, the contraction rate of the light guide plate mold in both lengthwise direction and widthwise direction must be kept unchanged.

Step S4: forming a light guide plate mold according to the counter deformation amount of the light guide plate mold and length and width dimensions of the light guide plate mold.

The present invention relates to a method for manufacturing a light guide plate mold, in which software is applied to simulate a formation process of a three-dimensional model of a light guide plate for the purposes of analysis. A simulation deformation amount can be obtained and is corrected to obtain a counter deformation amount of a light guide plate mold. A length dimension and a width dimension of the light guide plate model are corrected to obtain the length and width dimensions of the light guide plate mold. A light guide plate produced with the mold so manufactured with the method presents relatively high flatness, allowing for improvement of yield and efficiency of manufacturing of light guide plates.

In the description of the disclosure, the terms "an embodiment", "some embodiments", "example", "specific examples", or "some examples" are used to identify specific features, structures, materials, or characteristics described with the embodiment or example included in at least one embodiment or example of the present invention. In the disclosure, the use of the above terms does not mean the same embodiment or example. Further, the description of the specific features, structures, materials, or characteristics can be applied, in any suitable form, to one or multiple embodiments or examples.

The embodiments illustrated above are not construed as limiting the scope of protection of the technical solutions. Modifications, equivalent substitutions, and improvements that are made without departing from the spirits and principles of the above-described embodiments are considered within the scope of protection of the technical solutions.

What is claimed is:

1. A method for manufacturing a light guide plate mold, comprising the following steps: acquiring a deformation coefficient i, where 1<i≤1.12, and a size parameter j, where 0.03 mm<j≤0.05 mm; applying digital simulation software to simulate a formation process of an original three-dimensional model for a light guide plate so as to acquire a simulation deformation amount of the light guide plate; multiplying the simulation deformation amount with the deformation coefficient i to obtain a counter deformation amount of a light guide plate mold; and subtracting the size parameter j from a length and a width of the light guide plate to obtain length and width dimensions of the light guide plate mold; and forming the light guide plate mold according to the counter deformation amount of the light guide plate mold and length and width dimensions of the light guide plate mold;

wherein the size parameter is determined as an amount by which a dimension of a light guide plate product made with the light guide plate mold is greater than a target size; and wherein dimensions of the light guide plate mold so formed is first modified with counter deformation amount that is obtained with the simulation deformation amount of the light guide plate to be molded with the light guide plate mold and additionally modified by subtracting both the length and width of the dimensions of the light guide plate mold with the size parameter.

2. The method for manufacturing a light guide plate mold as claimed in claim 1, wherein the step of applying the digital simulation software to simulate a formation process of an original three-dimensional model for a light guide plate comprises using the digital simulation software to divide the original three-dimensional model of the light guide plate into grid units composed of a plurality of nodes and conducting simulation of an injection-molding process of the light guide plate so as to obtain the simulation deformation amount.

3. The method for manufacturing a light guide plate mold as claimed in claim 2, wherein the digital simulation software retrieves and converts node information of the grid units into a message file and a warpage deformation file, wherein the message file so formed comprises original coordinates of the grid nodes and the warpage deformation file so obtained comprises deformation-caused displacements of each of the nodes of the grid units in positive and negative axes of each of X, Y, and Z directions and an overall displacement of the node.

4. The method for manufacturing a light guide plate mold as claimed in claim 3, wherein the node displacement information comprises overall displacement information or local displacement information.

5. The method for manufacturing a light guide plate mold as claimed in claim 4, wherein the node displacement information comprises node number for each of the nodes.

6. The method for manufacturing a light guide plate mold as claimed in claim 1, wherein the simulation deformation amount is a deformation-caused displacement of one of the nodes having maximum deformation.

7. The method for manufacturing a light guide plate mold as claimed in claim 1, wherein the deformation coefficient i and the size parameter j are numerical values that are obtained through multiple times of test and experiment.

8. The method for manufacturing a light guide plate mold as claimed in claim 1, wherein the original three-dimensional model is simulated by using software.

9. The method for manufacturing a light guide plate mold as claimed in claim 1, wherein the digital simulation software is Moldflow or Moldex3D.

* * * * *